Aug. 23, 1966      H. L. PENBERTHY      3,268,320
GLASS FURNACE WITH MEANS TO AGITATE THE MOLTEN GLASS
Filed June 28, 1965      5 Sheets-Sheet 1

INVENTOR
HARVEY LARRY PENBERTHY

BY

ATTORNEYS.

Aug. 23, 1966  H. L. PENBERTHY  3,268,320
GLASS FURNACE WITH MEANS TO AGITATE THE MOLTEN GLASS
Filed June 28, 1965  5 Sheets-Sheet 2

INVENTOR
HARVEY LARRY PENBERTHY

BY  *Le Blanc and Shur*

ATTORNEYS.

Aug. 23, 1966　　　H. L. PENBERTHY　　　3,268,320
GLASS FURNACE WITH MEANS TO AGITATE THE MOLTEN GLASS
Filed June 28, 1965　　　　　　　　　　　　　5 Sheets-Sheet 3

INVENTOR
HARVEY LARRY PENBERTHY

BY

ATTORNEYS.

Aug. 23, 1966     H. L. PENBERTHY     3,268,320
GLASS FURNACE WITH MEANS TO AGITATE THE MOLTEN GLASS
Filed June 28, 1965     5 Sheets-Sheet 4

INVENTOR
HARVEY LARRY PENBERTHY

BY

ATTORNEYS.

Aug. 23, 1966   H. L. PENBERTHY   3,268,320
GLASS FURNACE WITH MEANS TO AGITATE THE MOLTEN GLASS
Filed June 28, 1965   5 Sheets-Sheet 5

INVENTOR
HARVEY LARRY PENBERTHY

BY

ATTORNEYS.

_United States Patent Office_ 3,268,320
Patented August 23, 1966

3,268,320
GLASS FURNACE WITH MEANS TO AGITATE
THE MOLTEN GLASS
Harvey L. Penberthy, 5624 SW. Admiral Way,
Seattle, Wash.
Filed June 28, 1965, Ser. No. 467,601
7 Claims. (Cl. 65—178)

This application is a continuation-in-part of copending application Serial No. 186,968, filed April 12, 1962, now abandoned.

This application relates to glass furnaces and more particularly to a method of and apparatus for improving the homogeneity of glass produced by such furnaces.

Inhomogeneity of glass melted in the conventional fuel-fired furnace has been a persistent problem in the glass industry and may be caused by any one of a number of factors. One such cause is the solution of the refractory sidewalls of the glass furnace, resulting in the formation of a significantly heavier glass. This heavier glass sinks to the bottom of the glass mass in the furnace and travels as a layer through the furnace to the throat and through to the feeders. Other causes of such inhomogeneity include inadequate or improper mixing and variations in raw materials. Still another cause is what is known as melting segregation. The instant invention relates to the elimination or substantial reduction of inhomogeneity due to such melting segregation.

When batch piles are charged into a furnace, the more easily fusible materials such as soda ash and borax are the first to melt. They tend to form eutectic liquids readily with lime and silica, which liquids are not as high in silica content as the final glass composition will be.

Since the batch is normally fed into the furnace from the wall opposite the conventional bridgewall throat separating the fining and working zones, initial melting results in a glass which is slightly lower in silicate content than the final average composition. As the batch piles moves down the furnace, they become richer in residual silica sand grains as the eutectic liquids, which are low in silica content as above stated, flow away without dissolving the sand grains fully. When the batch pile ceases to exist as a discreet body, the remaining foamy material atop the glass batch is quite high in silica content. For example, dip samples taken from a furnace, which was delivering glass of approximately 71% silica composition, have analyzed as high as 77% and 81% silica. Obviously, when glass of this composition is mixed with that having a normal composition, inhomogeneity results.

To overcome the inhomogeneity problem resulting from melting segregation, it has been customary in the glass industry, to operate furnaces with a glass hot spot, also known as the Gelhoff spring, at a point near the bridgewall. This serves to heat the glass in that region to a higher degree than the glass underneath the batch blanket near the backwall, so that a large longitudinal convection current results. This serves to keep the silica-rich foam back against the advancing batch piles, thus preventing the silica-rich glass from passing through the throat to the machines. A difficulty with this approach has been that it is not always easy to successfully maintain the hot spot in the optimum operating position.

The inhomogeneity problem resulting from melting segregation is particularly acute in long, narrow furnaces such as the type shown in Lyle Patent No. 2,890,547. In such furnaces, longitudinal convection currents are almost completely absent. Analyses of the surface foam in such furnaces, has indicated a progressively increasing silica content from the center of the furnace to the bridgewall throat.

In another instance, Mulholland Patent No. 2,203,269, has recognized the necessity for having a transverse barrier across the furnace, to be able to separate the longitudinal convection current from going underneath the batch and to allow a double corkscrew current to exist. The method used in that patent, involves providing a weir, which has the disadvantage of being vulnerable to corrosion attack by the glass when made of normal fusion cast refractories. While this patent represents an attempt at separating the two convection current systems in a glass furnace, as a practical matter, the Mulholland type of construction has been found not to work too well in maintaining the glass a longer time in the furnace to give more time to dissolve and mix the siliceous glass surface layer. The transverse convection current shown in the Mulholland patent has been definitely found not to be very vigorous and is not particularly enhanced by the use of the so-called high heat conducting walls, described in Mulholland Patent No. 2,068,925.

The users of the weir arrangement, according to the Mulholland system, consider that the pool 9 of FIGURE 3 of Patent No. 2,068,925 is a quiescent pool where seeds can rise to the surface. Applicant has not observed any particular double corkscrew action, simply because the cooling of the weir walls 12 and the bridge walls 27 are required to be approximately as effective in creating a downdraft, as the sidewalls 3 and 4. Accordingly, the convection currents in pool 9 of FIGURE 3 of that patent have no practical effect. Instead, the convection current pattern in pool 9 is a central spring approximately in the center around number 9 of FIGURE 3, extending in all directions towards the four walls.

It is accordingly a primary object of the present invention, to provide a novel and improved glass furnace, in which inhomogeneity due to melting segregation is either completely eliminated or substantially reduced.

It is another principal object of the present invention to provide an improved glass furnace in which inhomogeneity, due to melting segregation, is either completely eliminated or substantially reduced through the provision of at least one row of submerged electrodes, producing upwardly rising streams or springs of molten glass extending longitudinally of the furnace, the stream or spring farthest downstream being positioned at a point sufficiently close to the bridgewall throat so that in conjunction with other streams or springs it substantially eliminates direct passage through the throat of inhomogeneous silica-rich foam from the surface layer of the glass batch.

It is still a further object of the present invention to provide an improved glass furnace in which a plurality of vigorous convoluted or corkscrew type convection currents are formed on either side of a longitudinally extending heated zone of glass to substantially eliminate inhomogeneity due to melting segregation and, at the same time, to substantially eliminate defects due to passage into the working zone of unmelted bath.

It is a further object of the present invention to provide an improved glass furnace equipped with a novel arrangement of Joule effect electrodes so positioned relative to one another and to the bridgewall throat as to prevent direct passage through the throat of silica-rich foam located at the surface layer of the glass in the furnace, and, at the same time, to create a plurality of longitudinally staggered convection currents having a novel relationship one to the other.

It is still another object of the invention to provide a glass furnace including a melting zone and a bridgewall having a submerged throat separating a finding zone from a working zone wherein a series of rising streams of molten glass is longitudinally disposed and extends from adjacent the bridgewall in the direction of the melting zone with a second series of rising streams of molten glass transversely disposed across the width of the furnace at the termination of the first series of rising streams farthest removed from the bridgewall.

It is another object of the invention to provide a method of manufacturing glass in a furnace including a melting zone and a bridgewall having a submerged throat separating a fining zone from a working zone which includes the steps of creating a pair of longitudinal corkscrew convolute convection currents moving from about the edge of the batch blanket toward the bridgewall, and creating a convection current which extends transverse of the furnace and which originates around the edge of the batch blanket and which moves under the surface of the batch blanket.

It is still another object of the present invention to provide an improved method for reducing glass inhomogeneity in a glass furnace due to melting segregation.

These and further objects and advantages of the present invention will become more apparent upon reference to the following specification, claims and appended drawings wherein

The present invention involves the provision of apparatus for and a method of preventing the surface layers of silica-rich foam adjacent the bridgewall from descending directly to the bridgewall throat separating the fining and working zones and for otherwise eliminating inhomogeneity through the formation of two generally parallel currents of glass of convoluted or corkscrew configuration. The novel structures and process not only eliminate direct passage of silica-rich foam from the surface layers of the glass through the throat but, and equally important, prevent the passage through the bridgewall throat of undissolved bath and inhomogeneous portions of the glass mass. This invention is particularly useful in connection with fuel-fired glass furnaces.

Figure 1:
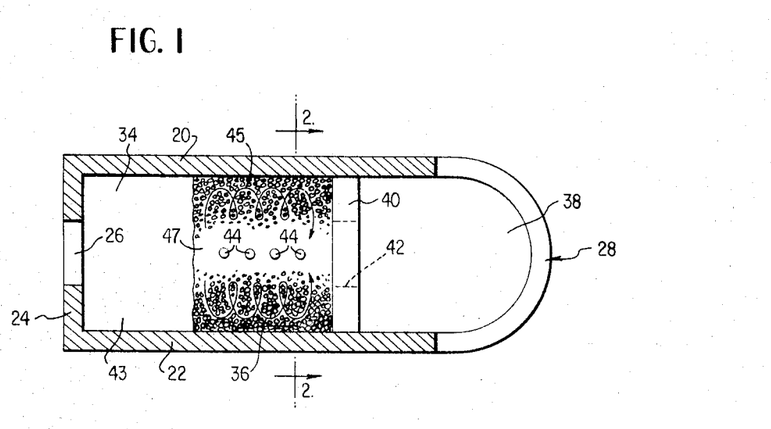
FIGURE 1 is a horizontal section, taken along the line 1—1 of FIGURE 2, of a furnace designed according to the present invention.
Figure 2:
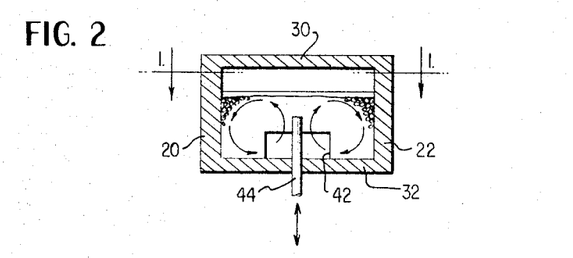
FIGURE 2 is a tranverse sectional view, taken along the line 2—2 of the furnace illustrated in FIGURE 1.

The invention is best illustrated by reference to the several drawings. As shown in FIGURES 1 and 2, the glass furnace essentially consists of sidewalls 20 and 22, a backwall 24 having a feed port 26, a working end 28, a crown 30 and a base or floor 32. The furnace is conventionally divided into three zones, a melting zone 34, a fining zone 36 and a working zone 38, the fining and working zones being separated by a bridgewall 40 having a submerged throat 42. (As pointed out in Patent No. 2,832,958, there is actually a fourth zone, the "foam zone," positioned between the melting and fining zones.) The batch pile in the melting zone is indicated at 43 and the silica-rich foam previously described is indicated at 45.

So much of the furnace of the present invention is completely conventional. In accordance with the present invention, however, a longitudinally extending row of rod-type electrodes 44 extends upwardly into the glass mass from the bottom or floor 32 of the furnace, the row of electrodes being sufficiently spaced from each of the sidewalls 20 and 22 of the furnace so that when the electrodes are energized, the heat release in the longitudinally oriented zone 47 in which the electrodes are situated is sufficiently greater than that in the proximity of the sidewalls 20 and 22 to produce the convolution-type convection currents shown in FIGURES 1 and 2.

As shown in FIGURES 1 and 2, the electrode farthest upstream is slightly downstream of the batch blanket 43. This feature is desirable to create the convoluted or spiral convection currents after the batch has been substantially melted out, so that the homogenizing system of the present invention will be concerned only with residual silica grains. Once such grains get caught in the spiral convection currents created by the system of the present invention, they travel for an extended period of time in the circulating current so that they are certain to be fully dissolved before arriving at the bridgewall throat 42. If large portions of unmolten batch are picked up by forming the spiral convection currents beneath the batch blanket, such portions will tend to float on the surface of the glass mass near the sidewalls and are apt to pass through the bridgewall throat without fully dissolving, resulting in inhomogeneity problems.

In a preferred embodiment of the invention, the electrodes should be in line with the bridgewall throat 42, the electrode closest to the bridgewall being positioned sufficiently close to throat 42 to create an upwardly moving convection current which will carry the silica-rich surface foam away from the throat, as shown by the arrows in FIGURE 2, to prevent such foam from passing directly from the surface of the glass through the throat and into the working zone 38. This position will, of course, vary depending upon the size of electrodes used, current density, etc. While there is no critical limit relative to the length of the row of electrodes which may be utilized, it has been found advantageous to position the electrodes in a row extending from ⅛ to ½ the distance between bridgewall 40 and backwall 24. As can be seen clearly through reference to FIGURES 1 and 2, the spiral convection currents which are formed through the present invention carry the silica-rich surface foam away from the electrode region in the central portion of the furnace, the siliceous foam moving to the sidewalls 20 and 22, respectively, and, in time, mixing with and dissolving into the main body of glass. Larger siliceous stones from the batch which would otherwise be picked up by the convection currents are substantially eliminated by the proper placement of electrodes, as shown. Were these stones to pass through the bridgewall throat to the machines, they would cause rejects. The corkscrew or convoluted convection currents are particularly beneficial in that they result in improved glass mixing and repeatedly bring glass to the surface in the glass hot spot for the easy release of bubbles, resulting in improved homogeneity. At the same time, refractory-laden glass is moved from the bottom of the furnace vigorously into the body of the glass and dispersed through it so that it does no harm.

While, as shown in FIGURES 1 and 2, there is a clear surface area in the immediate vicinity of the electrodes, it is not necessary as a practical matter to have a clearly defined mirror surface above the electrodes. It is sufficient if the updraft of glass at that point is merely strong enough to prevent the siliceous foam from descending directly to the bridgewall throat 42.

The height to which the electrodes rise into the glass may be chosen for the particular effect desired. For example, if the electrodes extend into the lower portion of the molten bath only, they tend to stimulate the convection current to a greater degree than if they extend to a point near the surface of the bath. This is particularly beneficial in a situation in which there is no problem with respect to the liberation of seeds from the glass.

On the other hand, if it is desired to liberate seeds and bubbles from the glass, it is better to have the electrodes extend to a point higher into the bath, possibly even to the glass surface. With such an arrangement, the glass which follows the electrodes up to the surface is extremely hot and the bubbles in the glass are readily released. To make possible this variation in height, the electrodes 44 are vertically adjustable up and down as illustrated by the double-ended arrow in FIGURE 2. That is, it is possible to vertically adjust the electrodes to permit confinement of the electrodes to a position near the bottom of the furnace, with a relatively stronger convection action and weaker boil action; or alternatively an extension of the electrodes to at or near the surface of the glass to produce a less strenuous convection current with relatively increased boil. Thus, the vertically projecting and adjustable electrodes extending from the furnace bottom 34 upwardly into the batch provide great flexibility for increased homogeneity in the product.

Figure 3:
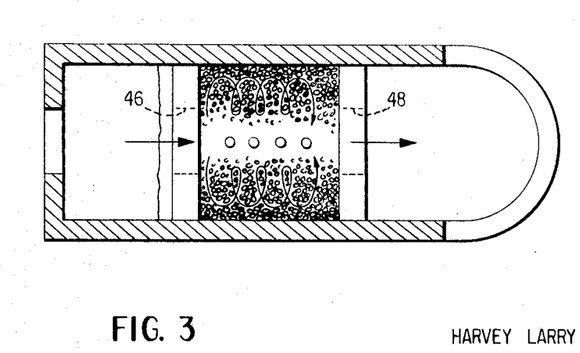
FIGURE 3 is a horizontal section of a furnace constructed according to another embodiment of the present invention.

The instant invention has been described above with respect to its use in a glass furnace having combined melting, foam and refining zones. The novel electrode arrangement of the instant invention is also usable, however, in a two-compartment furnace such as that shown in horizontal section in FIGURE 3, especially in the second compartment, in which case the convection currents force the glass to travel in corkscrew paths and thus insure that glass coming from the throat separating the first and second compartments does not travel in a short-circuit path directly to the second throat separating the second and third compartments. As shown in FIGURE 3, glass coming through the first throat 46 is under the control of the convection currents and cannot flow directly to the second throat 48 by channeling. Such channeling might easily take place were there no special means provided for preventing it. While baffles have been proposed in the past to avoid such short-circuiting, it is difficult to find materials which will withstand the erosive action of molten glass when surrounded on all sides by the glass.

Figure 4:
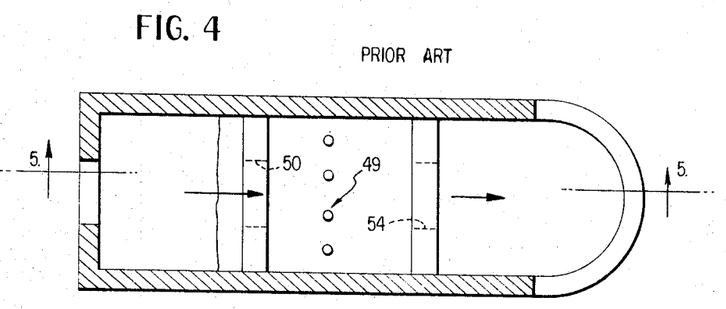
FIGURE 4 is a horizontal section taken along the line 4—4 of FIGURE 5, illustrating a prior art furnace construction in which the Joule effect electrodes are positioned in a transversely extending row across the furnace rather than in a longitudinally extending row as in the instant invention.
Figure 5:
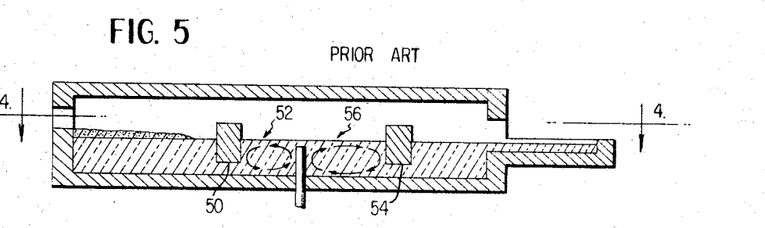
FIGURE 5 is a vertical section taken along the line 5—5 of FIGURE 4, illustrating the nature of the convection currents formed by the submerged electrodes in the prior art furnace shown in FIGURE 4.

The several advantages of an electrode system such as that illustrated in FIGURE 3 are more fully demonstrated by reference to a modified electrode arrangement such as that shown in FIGURES 4 and 5, which is representative of prior art. As may be seen in the latter electrode arrangement, a row of vertically extending electrodes 49 is arranged transversely across the central compartment of a three-compartment furnace. Material passing through the first throat 50 is caught in a first convection current indicated generally at 52 and undergoes a limited amount of mixing. But as soon as the material passes to the downstream side of the row of electrodes, it immediately moves toward the region of the second throat 54 on the next revolution of the convection current indicated generally at 56. This is another form of short-circuiting and is obviously undesirable.

Similarly, it has been proposed (Beck Patent No. 2,909,005) to arrange an arcuate row of bubblers around the throat. While such an arrangement is partially effective in keeping the siliceous foam away from the throat, it does not create the corkscrew or convoluted mixing action effected by the arrangement of electrodes according to the instant invention. With an arrangement such as shown in the Beck patent, a longitudinal convection current is stimulated so that glass which rises up from the bubblers moves under the batch pile and immediately returns to its point of origin, which is also a type of short-circuiting. An arrangement according to the instant invention, on the other hand, prevents the glass from moving quickly to the throat by requiring it to pass through a series of convolutions once it comes under the influence of the lateral corkscrew currents, thus giving the glass more time to homogenize and refine.

Figure 9:
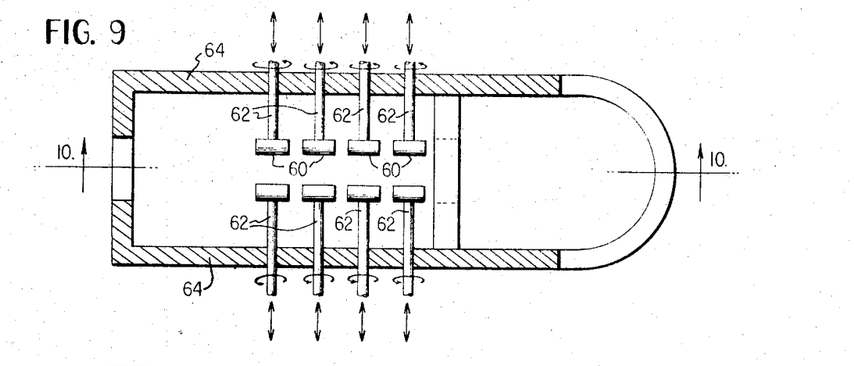
FIGURE 9 is a horizontal section of a modified furnace construction, illustrating the use of a plurality of rows of laterally adjustable and rotatable mallethead type electrodes.
Figure 10:
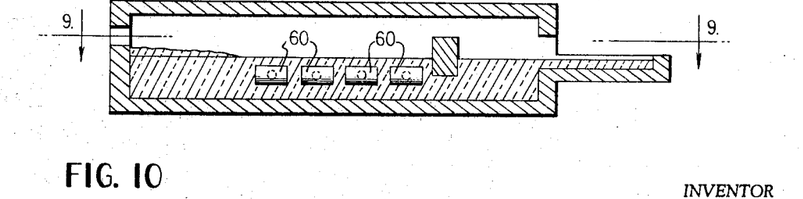
FIGURE 10 is a vertical section taken along the line 10—10 of FIGURE 9.
Figure 11:
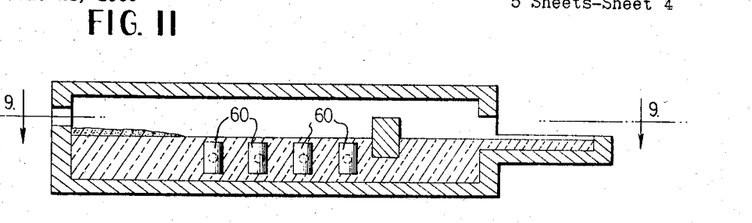
FIGURE 11 is a view similar to that of FIGURE 10 showing the mallethead type electrodes rotated through an angle of 90°.

FIGURES 9–11 illustrate still another electrode arrangement according to another embodiment of the present invention. In this modification, the electrodes consist of mallet shaped heads 60 which face each other along the longitudinal centerline of the furnace in two parallel rows. The electrode heads 60 are supported in the glass by means of elongated shanks 62 which are threaded into the heads. The shanks are both laterally adjustable through the sidewalls 64 of the furnace and are rotatable as indicated by the arrows in FIGURE 9. By means of such a structure, the centrally located longitudinal hot zone may be modified while the furnace is operating by advancing or retracting the electrodes 60 as desired. The convection currents which are formed are similar to those described in FIGURES 1 and 2. In one embodiment constructed in accordance with FIGURES 9 through 11 heads 62 each took the form of a heavy rod (2 inch diameter) forming the cross arm of a T and joined to its respective long shank 62 (1 and ¼ inch diameter) by means of threads, forming generally the shape of a croquet mallet. The shank of the electrode penetrates the furnace sidewall in an extensible and rotatable manner and by way of example only may pass through an electrode holder of the type described in my U.S. Patent 2,693,498. This permits adjustment in and out and also permits rotation of the head of the electrode from the horizontal position illustrated in FIGURE 10 to the vertical position illustrated in FIGURE 11. This construction also gives wide flexibility in terms of adjustment of the effective electrode height beneath the surface of the molten glass batch so as to provide either the relatively strong convection action or alternatively a strenuous boil and liberation of seeds as previously described in conjunction with the vertically adjustable electrodes of FIGURES 1 and 2.

It is to be noted, of course, that while the electrode arrangement in FIGURES 9 through 11 is such that all of the electrodes are shown positioned the same distance from the furnace sidewalls, the electrode arrangement may be varied to arrange individual pairs of electrodes at different distances from the sidewalls at different points along the length of the furnace.

Figure 12:
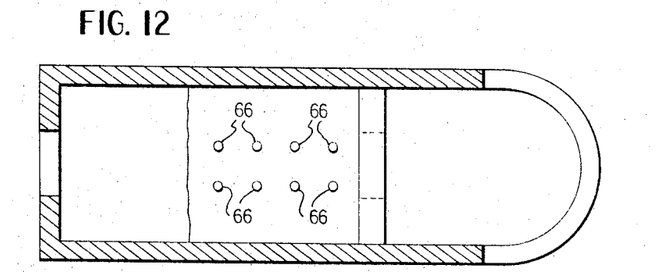
FIGURE 12 is a horizontal section showing still another form of furnace arranged according to the present invention, including two parallel longitudinally extending rows of vertically adjustable, rod-type electrodes.

One method of increasing the lateral breadth of the longitudinally extending central hot zone in the furnace is illustrated in FIGURE 12, in which two parallel rows of vertically adjustable rod-type electrodes 66 are illustrated. Except for the fact that the breadth of the central hot zone is increased, the manner of operation of such a furnace is similar to that illustrated in FIGURES 1 and 2. The two longitudinally extending rows should not, of course, be so far apart that they do not allow downdraft of glass between them and their respective sidewalls.

The structure of FIGURES 9 through 11 is particularly effective in the manufacture of dark-colored glass or higher resistance glasses. When vertical electrodes such as those illustrated in FIGURES 1 and 2 are used in the manufacture of such glasses, there is a possibility that the central hot zone will be too narrow and that the furnace sidewalls will be too cold. This problem is especially exaggerated in a situation in which the furnace is heated entirely by electricity, such as might be the case in the second chamber of a multi-chamber furnace.

In all of the arrangements previously described in which a plurality of rows of electrodes are utilized to form the longitudinally extending "hot zone" (i.e., FIGURES 9 through 12), the area of the glass mass between the electrodes has been substantially unobstructed. Such lack of physical obstruction between electrodes is extremely desirable, since this arrangement will permit the convection current on either side of the longitudinal hot zone to overlap with that of the other at the furnace floor, resulting in a greater degree of mixing and improved homogenization. To still further enhance the homogenizing effect of the present invention, however, a system such as is shown in FIGURES 13 through 15 may be employed.

Figure 13:
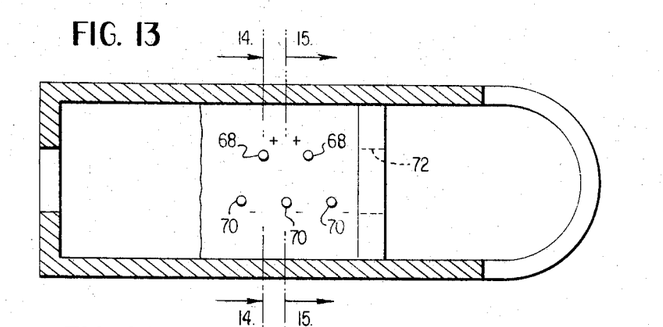
FIGURE 13 is a horizontal section of a modification of the furnace illustrated in FIGURE 12, showing the use of two longitudinally extending rows of vertical rod-type electrodes, the electrodes of one row being staggered with respect to those of the other row.
Figure 14:
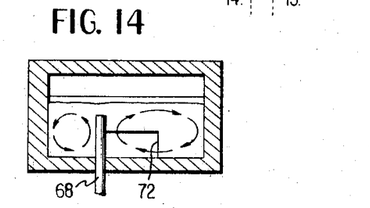
FIGURE 14 is a transverse section taken along the line 14—14 of FIGURE 13.
Figure 15:
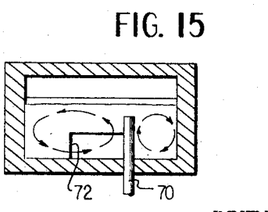
FIGURE 15 is a transverse section taken along the line 15—15 of FIGURE 13.

In the arrangement of FIGURES 13 through 15, electrodes 68 in one longitudinally extending row are longitudinally staggered with respect to electrodes 70 in the other longitudinally extending row. The result of such an electrode arrangement is illustrated in FIGURES 14 and 15. As there shown, the glass on one side of each of the electrodes moves through a significantly longer transverse convection current than the glass on the other side of the electrode. As the glass moves longitudinally through the furnace from one transverse plane (i.e., that of plane of 14—14 in FIGURE 13) to another (i.e., that of plane 15—15 of FIGURE 13), a portion of the glass in the longer convection current will be caught in a portion of the longer convection current of the next plane. Since these common portions are moving in different directions from one another, the glass in the common region will be mixed much more thoroughly than that in the regions closer to the sidewalls of the furnace. Since the more thoroughly mixed region of glass is in line with the bridgewall throat 72, the increased mixing results in added insurance against the passage through throat 72 of undesirable siliceous foam and the like.

Polarity of all of the previously described electrode arrangements except those of FIGURES 13 through 15 have not been shown since numerous single and polyphase arrangements, well known to those skilled in the art, may be used without sacrificing any of the advantages which have previously been described. In the electrode arrangement of FIGURES 13 through 15, however, it is desirable that no current pass between electrodes on the same side of the longitudinal centerline of the furnace since this would tend to make the entire region between the two longitudinally extending rows of electrodes uniformly hot, which would interfere with the formation of convection currents as described. When the electrodes on a given side of the longitudinal centerline are of like polarity with one another and of opposite polarity with those electrodes on the opposite side of the centerline, however, glass adjacent any one electrode will tend to move in a transverse convection current toward the furnace sidewalls, the convection current on one side of that electrode passing between two electrodes in the other row, as illustrated. In the preferred arrangement, alternating current is used in the system of FIGURES 13–15, the positive and negative symbols set forth in FIGURE 13 thus applying for only one-half of each cycle and the polarity being reversed for the other half of the cycle.

The electrodes usable in connection with the various embodiments of the instant invention may be constructed of any conventional electrode material, molybdenum, platinum, and carbon being examples of such materials.

While most of the furnace embodiments described have been discussed in connection with the use of particular longitudinal arrangements of electrodes, it is to be understood that satisfactory results may also be obtained through the substitution of bubblers for the electrodes. When bubblers are employed, however, they preferably are positioned in the lower one third of the tank.

As described in applicant's Patent No. 3,030,736, these bubblers may comprise tubes fabricated of an erosion resistant cast refractory material such as cast zirconium aluminate, a commercial example of which is the material manufactured under the trade designation "Zac" by Corhart Refractories of Louisville, Kentucky. As pointed out in that patent, when the bubblers are properly arranged with respect to one another, gas forced into the molten glass batch will form columns of rising glass, resulting in improved homogeneity of the glass product and increasing the heating efficiency of the furnace.

Figure 6:
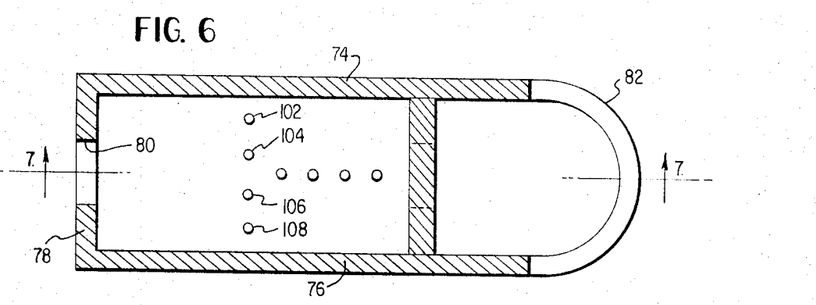
FIGURE 6 is a horizontal section, taken along the line 6—6 of FIGURE 7, of a preferred form of furnace arranged according to the present invention having a T-shaped electrode or bubbler construction.
Figure 7:
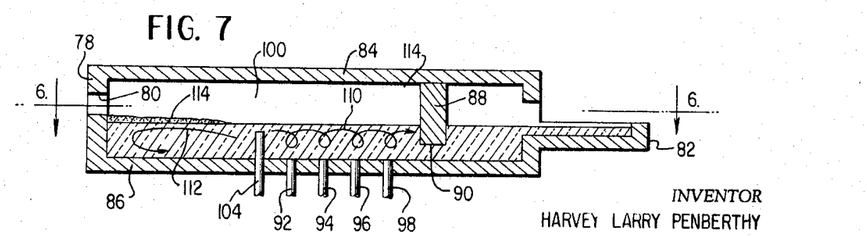
FIGURE 7 is a vertical section taken along line 7—7 of FIGURE 6.

Referring now to FIGURES 6 and 7, there is shown a further and preferred embodiment of the invention which includes, in addition to the longitudinally arranged and consecutively spaced rising streams of glass, a transverse arrangement of rising streams of glass disposed substantially at the foam zone of the furnace. The result is what will hereafter be referred to as a T disposition of rising streams or springs of glass which coact in a particularly efficacious manner to produce a highly improved glass homogeneity.

FIGURES 6 and 7 show a glass furnace essentially consisting of sidewalls 74 and 76, a backwall 78 having a feed port 80, a working end 82, a crown 84 and a base 86. A bridgewall 88 having a submerged throat 90 is disposed between the fining and working zones. A longitudinally disposed row of bubbler tubes 92, 94, 96 and 98 is arranged along the longitudinal centerline of the furnace substantially in line with the center of the throat 90. The bubbler 98 is disposed close to the throat 90 and, while there is no critical limit relative to the length of the row of bubblers which may be utilized, it has been found advantageous to position the bubblers in a row extending from ⅛ to ½ the distance between bridgewall 88 and backwall 78.

Vertical rod-type electrodes entering the floor of the furnace may be substituted for the bubblers 92–98 and will produce a greater refining action. Furthermore, by making the rod-type electrodes vertically adjustable similar to that in FIGURE 2, the flexibility previously described may be obtained. Bubblers may be utilized, however, where this additional refining is unnecessary and eliminate the expenditure of electrical power which is associated with electrodes. While individual bubbler tubes are shown, it will be appreciated that it is also possible to utilize grouped bubblers of the type disclosed in the aforementioned patent.

In Patent No. 2,832,958, there is described the existence of a foam zone which is disposed approximately at the position indicated at 100 in FIGURE 7. Substantially beneath this foam zone there are disposed a transverse row of vertical rod-type electrodes 102, 104, 106 and 108.

In operation, the longitudinally disposed bubblers, 92, 94, 96 and 98, create convolutions of convection current as indicated by the arrow 110 and as described in connection with the preceding embodiments of the invention. The transversely arranged electrodes 102, 104, 106 and 108 create a transverse thermal barrier with a rearwardly directed convection current indicated by the arrow 112. This last convection current carries heat beneath the unmolten batch 114 to aid in its melting and prevents unmolten batch from entering the fining zone at 114. The other half of the upwardly rising stream of glass created by the transverse electrodes 112–108 mushrooms to the right of the line of electrodes as seen in FIGURES 6 and 7 and is caught up and carried into the two separate corkscrew convolutions of convection current which exist on either side of the longitudinal centerline of the furnace. This is important in that it is desirable to prevent a blanket type of downstream surface convection current that would submerge at the bridgewall and thereby carry through the throat undesirable and non-homogeneous glass. The arrangement of FIGURES 6 and 7 has been found effective to prevent this occurrence and to provide a series of convection currents that produce a considerably improved glass product.

While the transverse row of rising streams of glass has been described as consisting of electrodes, it is possible to substitute bubblers but with some loss in the efficacy of the system. One reason for this is that while transverse bubblers provide the desired barrier effect, they lack the heat introduction characteristics of the electrodes and are not so efficacious in promoting melting of the batch.

Figure 8:
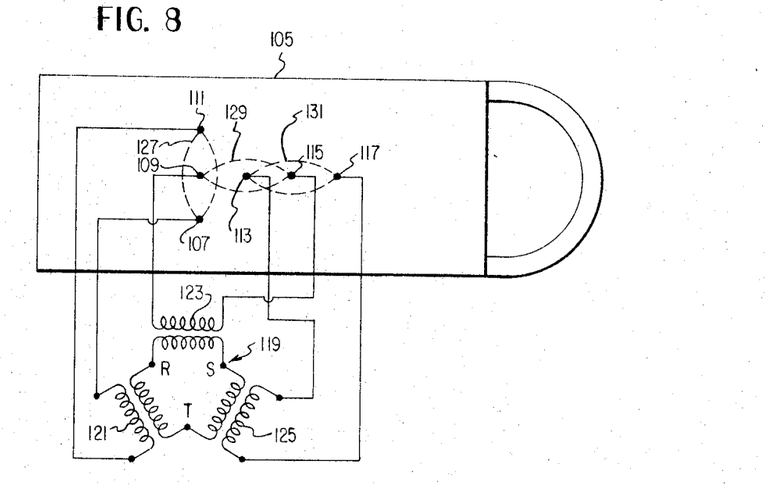
FIGURE 8 is a wiring diagram of a preferred T-shaped electrode spacing construction of the furnace of the present invention.

FIGURE 8 shows another modification incorporating the previously described T arrangement utilizing an all electrode construction. In this embodiment the furnace 105 which is otherwise similar to those previously described is provided with three transverse electrodes 107, 109 and 111, and three longitudinal electrodes 113, 115 and 117, positioned much in the manner of the bubblers and electrodes of FIGURES 6 and 7. The electrodes are energized from a delta connected transformer generally indicated at 119 adapted to be connected to a suitable three-phase electrical source at the taps labeled R, S, T, respectively. While secondary 121 feeds electrodes 107 and 111, secondary 123 supplies electrodes 119 and 115, while secondary 125 is electrically connected to electrodes 113 and 117.

The three-phase primary power line is connected to the terminals R, S, and T. The secondary windings are shown isolated from each other and connected one coil between two electrodes transversely arranged in the furnace, another coil connected to the first and third electrodes arranged along the centerline and the other coil or secondary connected to the second and fourth electrode of the centerline row. The action of this electrical arrangement is to spread the heat release more broadly than if the secondary connections were uniformly to say 109, 113, 115 and 117 consecutively. Also this leap-frog connection illustrated is useful in increasing the voltage requirement between electrodes, thus reducing the cost of the cables and making it easier to balance the three respective phases of the transformer for equal power.

In the diagram there are shown torpedo-shaped lines 127, 129 and 131 indicating the general flow of the current pattern between respective electrode pairs. However, in actual practice the spread of current is much broader than this. As in all prior instances, each of the electrodes is preferably vertically adjustable so as to obtain either a stronger convection action or a heavy boil, depending upon whether the electrode is located well below the molten surface for the stronger convection current or is moved vertically upward to extend close to or at the surface to produce a heavy boil.

Figure 16:
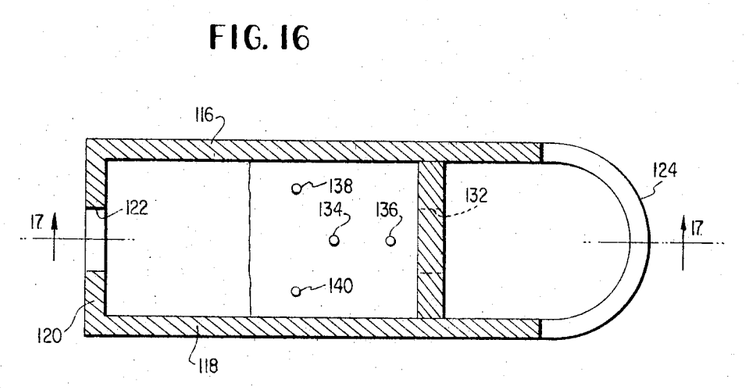
FIGURE 16 is a horizontal section, taken along the line 16—16 of FIGURE 17, showing still another embodiment of a glass furnace according to the invention.
Figure 17:
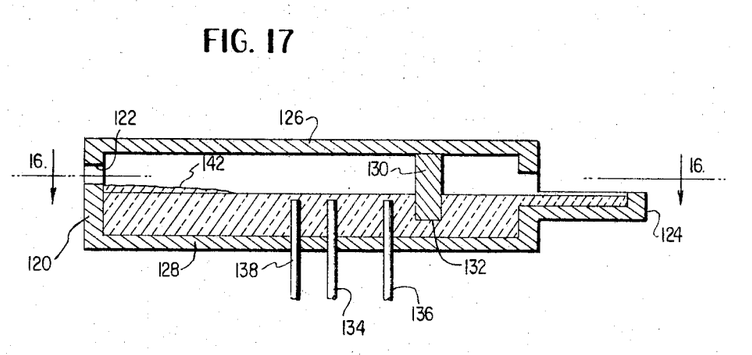
FIGURE 17 is a vertical section taken along the line 17—17 of FIGURE 16.

Referring now to FIGURES 16 and 17, there is shown a modification of the invention described in connection with the FIGURES 6 and 7, which also utilizes electrodes completely. Again, the overall configuration is the preferred T-shape construction. Thus, referring to FIGURES 16 and 17, there is shown a glass furnace essentially consisting of sidewalls 116 and 118, a backwall 120 having a feed port 122, a working end 124, a crown 126 and a base or floor 128. A bridgewall 130 having a submerged throat 132 is disposed between the refining and working zones. A longitudinally disposed row of vertical electrodes 134 and 136 is arranged along the longitudinal centerline of the furnace substantially in line with the center of throat 132. The electrode 136 is disposed close to the throat 132 and the electrode 134 is disposed on the downstream side of the edge of the batch blanket. Disposed in the general area of the edge of the batch blanket is a transverse row of vertical rod-type electrodes 138 and 140.

In operation, the longitudinally disposed electrodes 134 and 138 create corkscrew convolutions of convection current as described in connection with the preceding embodiments of the invention. The transversely arranged electrodes 138 and 140 create a transverse thermal barrier with a rearwardly directed convection current as described in conjunction with FIGURES 6 and 7. In the embodiment of the invention illustrated in FIGURES 16 and 17, the substitution of electrodes 134 and 136 for the bubblers used in FIGURES 6 and 7, provides additional refining action. Where desired, it is also possible to utilize additional electrodes beneath the unmolten batch 142 in order to accelerate melting, but care must be taken to insure that the convection currents created by such additional electrodes do not override the effect of the electrodes 134, 136, 138 and 140 in creating the previously described convection current action which produces the improved homogeneity which results from the practice of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a glass furnace of the continuous type having side walls and a melting zone, a fining zone and a working zone, and a glass-submerged throat between said fining and working zones, the improvement comprising: adjustable, spaced glass-immersed bubblers projecting into said furnace from subsurface points of entry and arranged substantially in a line coincident with a line extending longitudinally through said furnace and through said throat, the bubbler at the downstream end of said line being positioned substantially immediately upstream of said throat for forming two substantially convoluted convection currents in the glass in said furnace progressing in the direction of the longitudinal axis of said furnace, said current-forming means being located substantially downstream of said melting zone.

2. In a glass furnace including a melting zone and a bridge wall having a submerged throat separating a fining zone from a working zone; spaced localized energizing means projecting into said furnace for forming a first series of rising streams of molten glass longitudinally disposed and extending from adjacent the bridge wall in the direction of the melting zone, and a second series of rising streams of molten glass transversely disposed across the width of the furnace at the termination of said first series of rising streams farthest removed from said bridge wall, said energizing means forming the overall configuration of a T centered substantially on the longitudinal centerline of said furnace whereby said first series of streams create corkscrew convolutions of convection current on each side of said centerline and second series of rising streams create a transverse barrier convection current with portions mushrooming both upstream and downstream of the glass flow through said furnace.

3. Apparatus according to claim 2 wherein at least some of said energizing means are Joule-effect electrodes.

4. Apparatus according to claim 3 wherein said electrodes are wholly submerged in the molten glass in said furnace, said electrodes being vertically adjustable between a lower position and an upper position adjacent the surface of said molten glass to provide a variable heat induced agitation to said molten glass.

5. In a glass furnace including a melting zone and a bridge wall having a submerged throat separating a fining zone from a working zone; a series of bubble sources in the floor of said furnace disposed in a longitudinal line and extending from adjacent the bridge wall in the direction of the melting zone, and a series of vertical electrodes extending up through the furnace floor in a transverse row at the termination of said series of bubble sources farthest removed from said bridge wall, said bubble sources and electrodes forming the overall configuration of a T centered substantially on the longitudinal centerline of said furnace whereby said bubble sources create corkscrew convolutions of convection current on each side of said centerline and said electrodes create a transverse barrier of rising streams of molten glass with a first portion mushrooming downstream of the flow of molten glass through said furnace and a second portion mushrooming upstream of said glass flow to carry heat beneath the unmolten batch in said furnace.

6. In a glass furnace including a melting zone and a bridge wall having a submerged throat separating a fining zone from a working zone; a first series of vertical Joule-effect electrodes extending up through the furnace floor disposed in a longitudinal line and extending from adjacent the bridge wall in the direction of the melting zone, and a second series of vertical Joule-effect electrodes extending up through the furnace floor in a transverse row at the termination of said first series of electrodes farthest removed from said bridge wall, said first and second series of electrodes forming the overall configuration of a T centered substantially on the longitudinal centerline of said furnace whereby said first series of electrodes create corkscrew convolutions of convection current on each side of said centerline and said second series of electrodes create a transverse barrier of rising streams of molten glass with a first portion mushrooming downstream of the flow of molten glass through said furnace and a second portion mushrooming upstream of said glass flow to carry heat beneath the unmolten batch in said furnace.

7. Apparatus according to claim 6 wherein said electrodes are vertically adjustable through the floor of said furnace.

References Cited by the Examiner

UNITED STATES PATENTS

| 1,552,555 | 9/1925 | Grauel | 13—6 |
| 2,068,925 | 1/1937 | Mulholland | 65—347 |
| 2,283,188 | 5/1942 | Cornelius | 65—347 X |
| 2,350,734 | 6/1944 | Dumarest. | |
| 2,859,261 | 11/1158 | Arbeit | 65—178 X |
| 2,921,106 | 1/1960 | Arbeit | 65—136 |

FOREIGN PATENTS 128,904  8/1948  Australia.

DONALL H. SYLVESTER, *Primary Examiner.*

A. D. KELLOGG, *Assistant Examiner.*